United States Patent
Yang et al.

(10) Patent No.: US 8,694,586 B2
(45) Date of Patent: Apr. 8, 2014

(54) MAINTAINING CORRESPONDING RELATIONSHIPS BETWEEN CHAT TRANSCRIPTS AND RELATED CHAT CONTENT

(75) Inventors: Min Yang, Beijing (CN); Chang Yan Chi, Beijing (CN); Yu Hang Gao, Beijing (CN); Wen Peng Xiao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 12/494,582

(22) Filed: Jun. 30, 2009

(65) Prior Publication Data

US 2010/0005268 A1 Jan. 7, 2010

(30) Foreign Application Priority Data

Jun. 30, 2008 (CN) .......................... 2008 1 0127448

(51) Int. Cl.
*G06F 15/16* (2006.01)
(52) U.S. Cl.
USPC ........................... 709/204; 709/205; 709/206
(58) Field of Classification Search
USPC ................................................. 709/204–206
See application file for complete search history.

(56) References Cited

U.S. PATENT DOCUMENTS

| | | | |
|---|---|---|---|
| 6,785,708 B1 | 8/2004 | Busey et al. | |
| 7,181,492 B2 | 2/2007 | Wen et al. | |
| 7,657,604 B2 * | 2/2010 | Kim et al. | 709/206 |
| 7,856,469 B2 * | 12/2010 | Chen et al. | 709/204 |
| 7,882,084 B1 * | 2/2011 | Amdahl | 707/693 |
| 7,886,012 B2 * | 2/2011 | Bedi et al. | 709/206 |
| 7,933,957 B2 * | 4/2011 | Daniell | 709/206 |
| 8,065,427 B1 * | 11/2011 | Johnson et al. | 709/231 |
| 2003/0195928 A1 | 10/2003 | Kamijo et al. | |
| 2003/0220885 A1 * | 11/2003 | Lucarelli et al. | 705/64 |
| 2005/0243746 A1 * | 11/2005 | Mutikainen et al. | 370/282 |
| 2006/0053195 A1 * | 3/2006 | Schneider et al. | 709/204 |
| 2006/0161852 A1 | 7/2006 | Chen et al. | |
| 2006/0167994 A1 | 7/2006 | Chen et al. | |
| 2007/0300169 A1 | 12/2007 | Jones et al. | |

OTHER PUBLICATIONS

Bobrow et al., "Conversation Support in a Collaboration Space for a Distributed Workgroup," http://www.socialcomputingresearch.net/chi_papers/Bobrow_Cheslow_Churchill_Nelson_Whalen.doc, downloaded on Aug. 15, 2013, pp. 1-3.

* cited by examiner

*Primary Examiner* — David Lazaro
*Assistant Examiner* — Marie Georges Henry
(74) *Attorney, Agent, or Firm* — Holland & Knight LLP; Brian J. Colandrea, Esq.; Jeffrey T. Placker, Esq.

(57) ABSTRACT

A method, apparatus, and system for maintaining corresponding relationships between at least one chat transcript and related chat content in an instant messaging system may include establishing a chat session in the instant messaging system. Corresponding chat content may be displayed synchronously according to a changed address of the chat content. The changed address of the chat content may be inserted into a chat transcript, and the chat transcript may be segmented into at least two segments to create a segmented chat transcript. The segmented chat transcript and corresponding relationship between the changed address of the chat content and corresponding chat transcript segments may be stored.

17 Claims, 5 Drawing Sheets

MAINTAINING CORRESPONDING RELATIONSHIPS BETWEEN CHAT TRANSCRIPTS AND RELATED CHAT CONTENT

RELATED APPLICATIONS

This application claims the benefit of Chinese Patent Application Number 200810127448.4 filed on 30 Jun. 2008, the entire contents of which are herein incorporated by reference.

BACKGROUND OF THE INVENTION

This disclosure relates to maintaining corresponding relationships between chat transcripts and related chat content in an instant messaging system.

Instant messaging (IM) may be an important collaboration technique for real-time communication among users. IM may facilitate quick exchange of information like uniform resource locators (URLs) or file snippets, which may be difficult to exchange via traditional real-time communication tools such as telephones. It may be common for users to discuss something via IM based on specific content, such as a webpage or a local file like a document. For instance, a user may send a URL to other users, and then may chat with the other users for content corresponding to the URL. In another scenario, after sending a document to other users, a user may chat with the other users based on the document. Some present IM products, such as Lotus Sametime, may support viewing related content in an IM side window.

In an enterprise environment, several users may chat (real-time) on a topic and may wish to share their chat transcript with other users (e.g., team members) who may not have taken part in the real-time chat. To do this, they may have to copy the chat transcript and send it other users. If the chat is based on specific content (e.g., a file or URL), the user may describe the corresponding relationship between the chat transcript and related content. This may make it difficult to associate the chat transcript with the related content. For instance, during development of a software project, developers in different locations may review code through IM, and may tell other developers via IM which file and which line of code they are talking about. After chatting, the chat transcript may be stored separately from the program code, and the corresponding relationship between the program code and its related chat transcript may not be maintained. On the contrary, if related chat transcript may be maintained with program code, they may be conveniently referenced in future to understand factors which may have been considered during programming.

In a customer service environment, serving customers through IM, in call center for example, may be better than traditional call support in some specific areas. When a customer wants to get help from a call center through IM, he or she may send a URL or a screenshot of the problem to a specialist in the call center. The specialist may then tell the customer how to solve the problem. After a chat (e.g., via IM), the corresponding relationship between the problem content and the chat transcript may not be saved. In this circumstance, if another customer subsequently wants help with the same the problem, the specialist may have to input the answer or solution to the problem again. Although the specialist may search his chat transcript for the answer or solution to the problem, it may be not be easy for him to locate the wanted text in the transcript effectively. Instead, if the corresponding relationship between the problem content and the related chat transcript could be maintained, a specialist could look for the corresponding answer according to linkage stored previously if facing problems based on the same content. This may help the specialist respond to the problem sent by the customer more quickly. A specialist's performance may also be evaluated with the help of the corresponding relationship between the problem content and its related chat transcript, if maintained.

Present instant messaging communication and techniques may maintain only the chat transcript, and may not maintain the linkage between the transcript and the related content. Users often may need to search their entire chat transcript history to retrieve required information. Even if the corresponding chat transcript can be retrieved in this manner, it may be ineffective.

BRIEF SUMMARY OF THE INVENTION

In a first implementation, a method for maintaining corresponding relationships between at least one chat transcript and related chat content in an instant messaging system may comprise establishing a chat session in the instant messaging system. The method may also comprise displaying corresponding chat content synchronously according to a changed address of the chat content. The method may further comprise inserting the changed address of the chat content into a chat transcript, and segmenting the chat transcript into at least two segments to create a segmented chat transcript. Additionally, the method may comprise storing the segmented chat transcript and corresponding relationship between the changed address of the chat content and corresponding chat transcript segments.

In one or more embodiments an apparatus for maintaining corresponding relationships between at least one chat transcript and a related chat content in an instant messaging system may comprise a synchronizing means for establishing a chat session in the instant messaging system. The apparatus may also comprise a chat content address change controlling means for controlling synchronized display of corresponding chat content, according to a changed address of chat content received from the synchronizing means. The apparatus may further comprise a chat recording means for inserting the changed address of the chat content into a chat transcript, and segmenting the chat transcript into at least two segments to create a segmented chat transcript. Additionally, the apparatus may comprise a storage means for storing the segmented chat transcript and corresponding relationship between chat content and corresponding chat transcript segments.

Moreover, in one or more embodiments, an instant messaging system may include an apparatus for maintaining corresponding relationships between at least one chat transcript and a related chat content in an instant messaging system and may comprise a synchronizing means for establishing a chat session in the instant messaging system. The instant messaging system may also comprise a chat content address change controlling means for controlling synchronized display of corresponding chat content, according to a changed address of chat content received from the synchronizing means. The instant messaging system may further comprise a chat recording means for inserting the changed address of the chat content into a chat transcript, and segmenting the chat transcript into at least two segments to create a segmented chat transcript. Additionally, the instant messaging system may comprise a storage means for storing the segmented chat transcript and corresponding relationship between chat content and corresponding chat transcript segments.

DETAILED DESCRIPTION OF THE INVENTION

Figure 1:
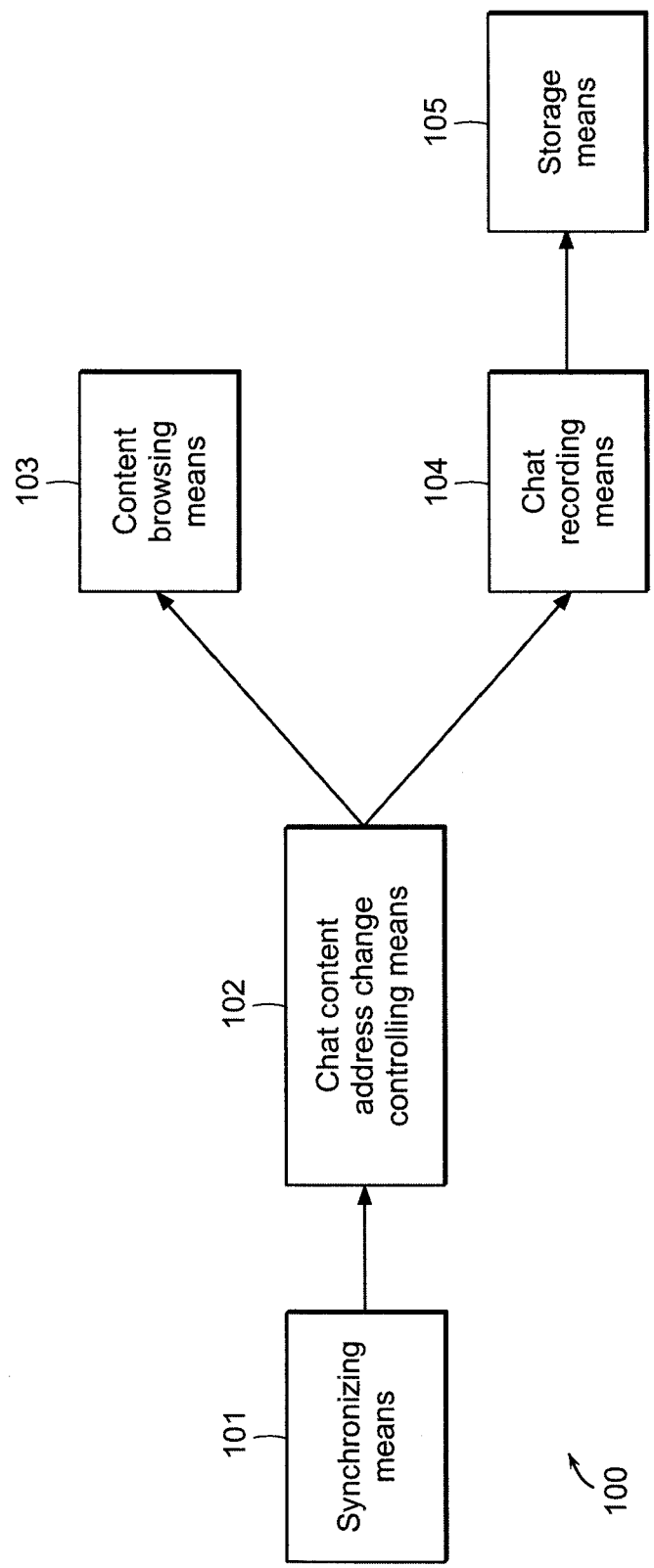
FIG. 1 is a block diagram of an apparatus for maintaining corresponding relationships between chat transcripts and related contents in an instant messaging system.

Referring to FIG. 1, there is shown a block diagram of an apparatus 100 for maintaining the linkages between chat transcripts and related contents in an instant messaging system, according to the present disclosure. As shown in FIG. 1, apparatus 100 may comprise synchronizing means 101, chat content address change controlling means 102, content browsing means 103, chat recording means 104 and storage means 105.

In the present disclosure, synchronizing means 101 may be used to establish a chat session with other users in an instant messaging system and receive changed chat content addresses. After receiving a changed chat content address from synchronizing means 101, chat content address change controlling means 102 may control content browsing means 103 to synchronize the content display corresponding to that address for each participant in the session. Chat content address change controlling means 102 further may send the changed address to chat recording means 104, which may record the chat as a chat transcript and insert the addresses of the changed contents into the chat transcript, thereby to segmenting it into multiple segments. The segmented chat transcript and the linkages between the chat content addresses and corresponding transcript segments may be stored in storage means 105 which may be connected to chat recording means 104.

In one or more embodiments of the present disclosure, the above-mentioned means may be implemented in software, hardware, firmware or any combination thereof. In addition, the connections between these means may be established with interfaces existing in current instant messaging systems.

According to one embodiment of the present disclosure, the chat content address may be a uniform resource locator (URL). According to another embodiment of the present disclosure, the chat content address may be a uniform resource identifier (URI). According a further embodiment, the chat content address may be a uniform resource name (URN). According yet another embodiment of the present disclosure, the URL may be the address of a resource on the Web or a local file.

According to an additional embodiment of the present disclosure, chat recording means 104 may insert the addresses of the changed chat contents into the chat transcript as separators, to segment the whole transcript into multiple segments, each of which may correspond to a distinct address. In another embodiment of the present disclosure, storage means 105 may store the segmented chat transcript into the chat content as metadata. As one browses the chat content, according to the relationship between the content and the stored segmented chat transcript, the corresponding chat transcript may be obtained. According to a further embodiment of the present disclosure, the synchronizing means may further associate the established session with corresponding chat contents.

According to still another embodiment of the present disclosure, the storage means may obtain the address of the chat content, and the chat transcript segment between that address of chat content and the address of next content. It may then associate the chat content with the chat transcript segment, and may thereby obtain the corresponding relationship between the address of chat content and the corresponding chat transcript segment.

Figure 2:
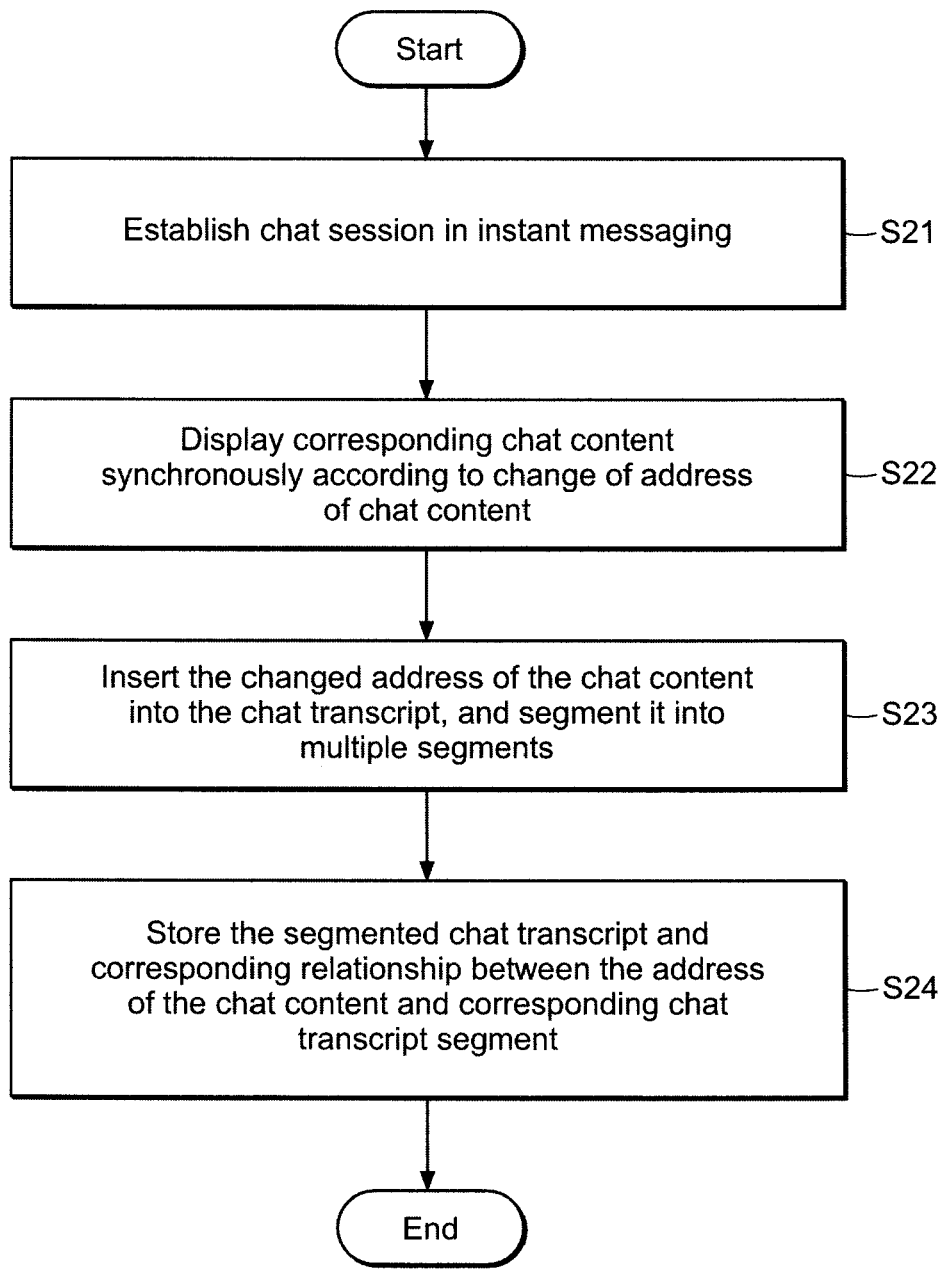
FIG. 2 is a flowchart of a method for maintaining corresponding relationships between chat transcripts and related contents in an instant messaging system.

Referring now to FIG. 2 there is shown a flowchart of a method for maintaining corresponding relationships between chat transcripts and related contents in an instant messaging system, according to the present disclosure. As shown in FIG. 2, a chat session may be established in the instant messaging system at S21. At S22, the chat content may be displayed synchronously according to the change of the chat content address. At S23, the address of the changed chat content may be inserted into a chat transcript, to segment it into multiple sections. The segmented chat transcript, and, the corresponding relationship between the chat content addresses and corresponding chat transcript segments, may be stored at S24.

According to one embodiment of the present disclosure, the chat content address may be a uniform resource locator (URL). According to another embodiment of the present disclosure, the chat content address may be a uniform resource identifier (URI). According to still a further embodiment, the chat content address may be a uniform resource name (URN). According to an additional embodiment of the present disclosure, the URL may be the address of a resource on the Web or a local file.

According to another embodiment of the present disclosure, the addresses of the changed chat contents may be inserted into the chat transcript as separators at S23, and then the whole transcript may be segmented into multiple chat transcript segments, each of which may correspond to a distinct address. According to a further embodiment of the present disclosure, at S24, the segmented chat transcript may be stored into the chat content as metadata. As a user may browse the chat content later, the chat contents, the segmented chat transcript and the corresponding relationships between the chat contents and the transcript segments may be obtained simultaneously. According to other embodiments of the present disclosure, S21 may further comprise associating the established chat session with corresponding chat contents.

In yet another embodiment of the present disclosure, the corresponding relationship between the chat content address and corresponding chat transcript segments may be obtained by acquiring the address of a chat content, acquiring the chat transcript segment between the address of the chat content and the address of a next chat content, and associating the address of the chat content with the acquired chat transcript segment.

Referring back to FIG. 2, a method for maintaining corresponding relationships between chat transcripts and chat content in an instant messaging system will be discussed in further detail. In one embodiment a chat content address may be represented by a URL. According to another embodiment of the present disclosure, the URL may indicate a resource on the Web. In still another embodiment of the present disclosure, it may be an address of a local file or a document section.

At S21, a user may establish a chat session with other users via instant messaging communication, and the chat session may be associated with corresponding chat content. At S22, according to the change of URL, corresponding chat content may be displayed for each participant in a synchronized manner. In general, the change of the URL may be realized in the following two ways: (1) the user may enter a new URL to change the chat content as necessary, or (2) as to a lengthy chat content with multiple pages, each page of the content may be assigned with a unique URL, and therefore there may be multiple different URLs corresponding to a single chat content. Thus, a page switch and a URL change may occur when the user turns forward, turns back or browses to a certain page.

In the second way, for example, each page of a PPT document may be assigned with a URL, and thus there may be multiple URLs corresponding to a single PPT document. That is, each page of the PPT document may correspond to a document segment, and each document segment may correspond to a distinct URL. When the user turns forward or backward to browse a certain page of the PPT document, the above operation may be based on the change of URL, and therefore browsing each page of the PPT document may be treated as the result of a URL change. According to one embodiment of the present disclosure, a URL change may be launched by the user initiating the chat session. In another embodiment of the present disclosure, the URL change may be launched by other participants of the chat session.

At S22, the user may link a URL to a chat session either by inputting the URL into a text input area in the chat window directly, or by dragging and dropping it into a certain area of the chat window. Depending upon the content type of the URL, a corresponding content viewer may be launched in the chat area of the chat window to show the chat content corresponding to that URL. In one embodiment of the present disclosure, the URL may link to a PDF document, and a PDF viewer may be launched. In another embodiment of the present disclosure, the URL may link to an HTML page and a Web browser may be launched accordingly.

Next, by means of the synchronizing means of the user changing the URL, the changed URL may be sent to a communication server in the instant messaging system, which in turn may send a system message containing the changed URL to synchronizing means of other users. The synchronizing means of other participants may send that message to their corresponding URL change controlling means, and each URL change controlling means of other participants may retrieve the changed URL from that message, and may send it to the content browsing means and the chat recording means respectively. The URL change controlling means may control the content browsing means to display the chat content for other participants in a synchronizing manner. According to one embodiment of the present disclosure, the URL may link to a resource on the Web. Other users may access the URL through their content browsing means to show the corresponding chat content synchronously.

According to another embodiment of the present disclosure, the URL may link to a local file, and the content corresponding to the URL may be displayed synchronously in one of the following implementations. In one implementation, the user may upload the local file to a communication server, which may generate a new URL for that document, and then may process it as resource on Web. That is, the server may send a system message containing the new URL to the synchronizing means of other participants, whose content browsing means may access the new URL as to display the chat content synchronously.

In a second implementation, the user may send the whole file to others through IM, and the file may be stored in each local machine of other participants. When viewing a certain segment of that document, the user controlling navigation may send the URL corresponding to that segment to the synchronizing means of other participants through the communication server, and then the content browsing means of other participants may access the new URL to display the same content synchronously.

In a third implementation, the content displayed in the chat area may be printed as one or more images and sent to other users, who may launch their image viewer to display these images synchronously. It should be noted that the URLs corresponding to these images may be inserted in the chat transcript for the user taking the images. For other participants, the URLs corresponding to these images may not be inserted in their chat transcripts.

At S23, the chat recording means of the user may record the chat as a chat transcript, may insert the changed URL into chat transcript, and may segment it into multiple chat transcript segments. Specifically, when each participant browses the contents corresponding to the changed URLs through the content browsing means, and the chat starts, the chat recording means may record the chat as a transcript and may insert the changed URLs into the chat transcript as separators, and may further segment it into multiple chat transcript segments, each of which correspond to a URL.

According to one embodiment of the present disclosure, the URL may be placed before each chat transcript segment to show the relationship between the chat transcript segment and the URL. In another embodiment of the present disclosure, each segment may be a raw chat transcript without any modification. According to yet another embodiment of the present disclosure, the segment may be a summarized and/or revised transcript.

At S24, the user may store the segmented chat transcript and the relationship between the URLs and corresponding chat transcript segments. Specifically, at S24, the relationship between the URL and corresponding chat transcript segment may be obtained by: (1) acquiring the URL of a chat content, (2) acquiring the chat transcript segment between that address of the chat content and the address of next chat content, and (3) associating the RRL with the acquired chat transcript segment.

According to one embodiment of the present disclosure, both the chat content and the application processing the content may support storing metadata in a file. After the chat, the segmented chat transcript may be stored in the chat content as a kind of metadata. When a user browses the chat transcript later, the chat contents, the segmented chat transcript and the corresponding relationships between the chat contents and the transcript segments may be obtained simultaneously.

According to another embodiment of the present disclosure, at least one of the chat content and the application processing the content may not support metadata. After the chat, the user may maintain the segmented chat transcript and the URLs corresponding to each transcript segment in a storage module. When a user chats on the same content again in an application, based on the URLs of the chat contents, the transcript segment corresponding to the URL may be retrieved easily. After retrieving the required transcript segment from the storage module, it may be utilized according to the specific requirement of that application. According to a further embodiment of the present disclosure, the storage module may be located on the user's local machine. According to yet another embodiment of the present disclosure, the storage module may be located on a server.

Figure 3:
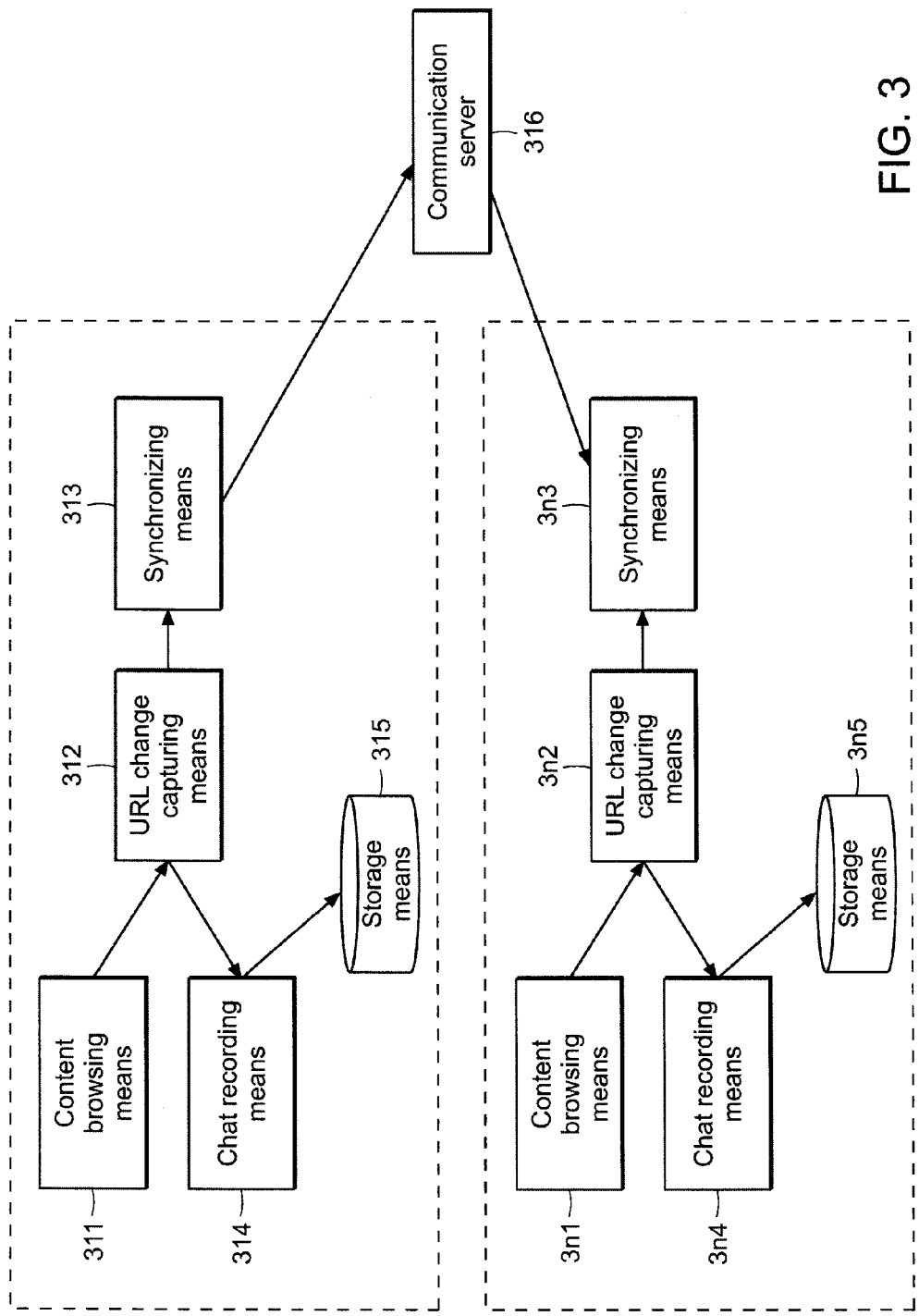
FIG. 3 is a block diagram of an instant messaging system for maintaining corresponding relationships between chat transcripts and related contents, according to one embodiment of the present disclosure.

Referring now to FIG. 3, there is shown a block diagram of an instant messaging system 300 for maintaining the corresponding relationships between chat transcripts and related contents according to one or more embodiments of the present disclosure. As shown in FIG. 3, instant messaging system 300 may comprise n (where n may be an integer greater than 1) users. User 1 may comprise content browsing means 311, URL capturing means 312, synchronizing means 313, chat recording means 314, and storage means 315. Accordingly, user n may comprise content browsing means 3n1, URL change controlling means 3n2, synchronizing means 3n3, chat recording means 3n4, and storage means 3n5. Furthermore, instant messaging system 300 may comprise communication server 316, which may be used to establish instant communication among the users. In this embodiment, the chat content address may be a URL indicating a resource on the Web or a local file.

In one or more embodiments instant messaging system 300, instant communication connections may be established among multiple users in a chat session, and the chat session may be associated with the chat contents. When the chat content's URL changes, it may be captured by URL capturing means 312 of user 1. According to the changed URL, content browsing means 311 of user 1 may display the corresponding content.

Next, the changed URL may be sent to communication server 316 from synchronizing means 313 of user 1. Communication server 316 may send a system message containing the changed URL to the synchronizing means 3n3 of other participants, which in turn may send the system message to their URL change controlling means 3n2. Each URL change controlling means 3n2 may acquire the changed URL from the system message, and may send it to content browsing means 3n1 and chat recording means 3n4 respectively. Each URL change controlling means 3n2 may control content browsing means 3n1 to display the chat content corresponding to the changed URL synchronously.

While viewing the chat content corresponding to the changed URL by the respective content browsing means, users 1-n participating in the chat session may start the chat, and each chat recording means 314-3n4 may record the chat as a transcript, and may insert the changed URL in the chat transcript to segment it into multiple segments. According to one embodiment of the present disclosure, the changed URLs may be inserted into the chat transcript as separators to segment it into multiple segments, each of which may correspond to a distinct URL. User 1 may store the segmented chat transcript and the corresponding relationship between the URL and corresponding chat transcript segment in storage means 315. Likewise, user n may store the segmented chat transcript and the corresponding relationship between the URL and corresponding chat transcript segment in storage means 3n5.

According to one embodiment of the present disclosure, both the chat content and the application processing the content may support storing metadata in a file. After the chat, the segmented chat transcript may be stored in the chat content as a kind of metadata, and therefore, the chat contents, the segmented chat transcript and the corresponding relationships between the URL and corresponding chat transcript segments may be stored at the same time. According to another embodiment of the present disclosure, the storage module may be located on the user's local machine. According to yet another embodiment of the present disclosure, the storage module is located on a server.

Figure 4:
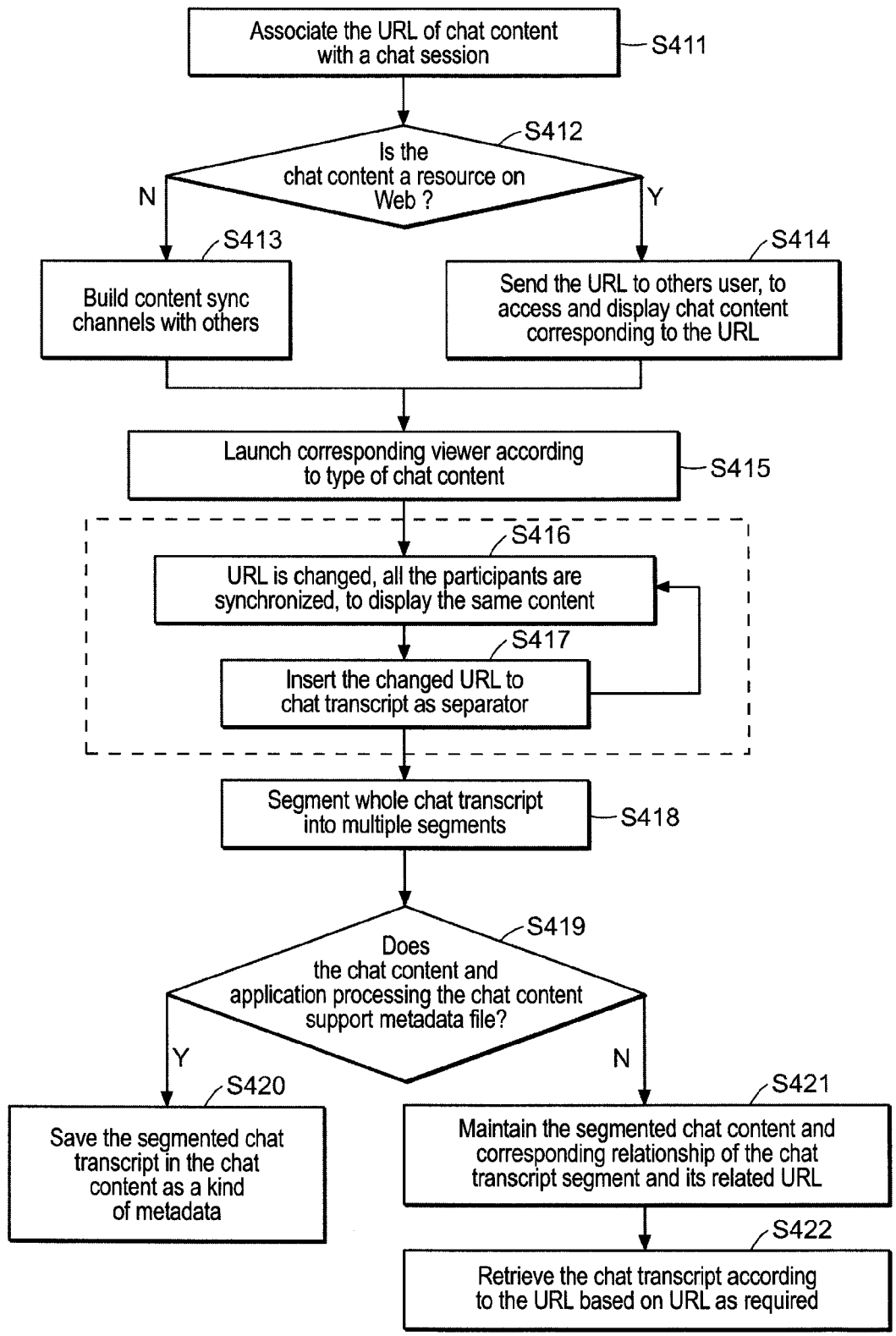
FIG. 4 is a flowchart of a method for maintaining corresponding relationships between chat transcripts and related contents in an instant messaging system.

Referring now to FIG. 4, there is shown a flowchart of a method for maintaining corresponding relationships between chat transcripts and related chat contents in an instant messaging system, according to one embodiment of the present disclosure. As shown at S411, when a user attempts to access a certain content in the chat area of the chat window, the URL of the content may be associated with the chat session by the instant messaging system. At S412, it may be determined whether the content is a resource on Web. If so, the user initiating the chat session may send the URL to other participants through a communication server of the IM system. At S414, other users may access and view the chat content corresponding to the URL.

If the content is not a resource on the Web, as shown at S413, the user initiating the chat session may build a content synchronizing channel with other users participating the chat session. For example, the user may upload the chat content to a server, and may send the other users participating the chat session the address of the content located on the server, so they may access and view the chat content. At S415, according to the type of the chat content, the other users participating the chat session may launch corresponding viewer to display the chat content. At S416, when the URL of the chat content is changed by a user, the content corresponding to the changed URL may be displayed to the user. On the other hand, the user may send the changed URL to the other participants to display the content corresponding to the changed URL for them synchronously. It should be understood, that the change of the URL may be launched either by the user initiating the chat session, or by other users participating the chat session.

Further, at S417, each user may insert the changed URL in the corresponding chat transcript as a separator, and may segment the chat transcript into multiple transcript segments with the changed URL at S418. At S419, it may be determined whether both the chat content and the application processing the chat content support metadata files. If so, as shown at S420, the segmented chat transcript may be stored in the chat content as a kind of metadata. Moreover, at S421, if at least one of the chat content and the application processing the chat content does not support metadata files, after the chat, the segmented chat transcript and the corresponding relationships between the URL and corresponding chat transcript segments may be stored in the storage means. As shown at S422, when a user needs to chat on the same content again in an application, based on the URL of the chat contents, the chat transcript segment corresponding to the URL may be retrieved easily.

In one embodiment of the present disclosure, the storage module may be located on the user's local machine. In another embodiment of the present disclosure, the storage module of the user may be located on a server.

Figure 5:
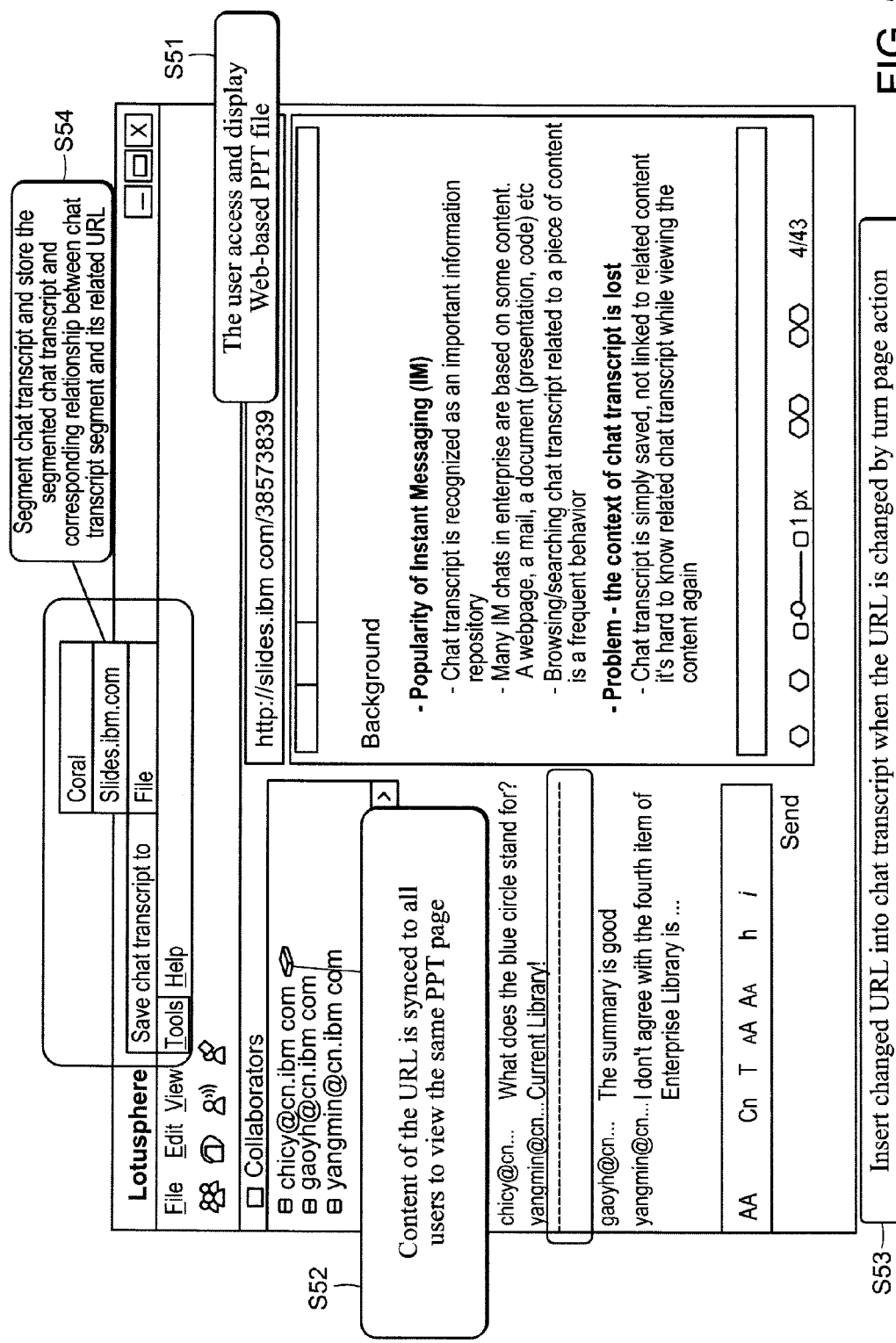
FIG. 5 is a graphical user interface showing storing a segmented chat transcript and associating the segmented chat transcript with corresponding slides when chatting on a PPT document via an instant messaging system.

Referring now to FIG. 5, there is shown a graphical user interface showing storing the segmented chat transcript and associating the segmented chat transcript with corresponding slides when chatting on a PPT document by means of the instant messaging system, according to one embodiment of the present disclosure. At S51, after the chat starts by instant messaging, the user may enter the URL of a Web-based PPT in the chat session. The URL may be sent to the other users, and the PPT file may be displayed in respective chat areas of the other users. At S52, one of the users participating the chat session may be designated to control the navigation of the PPT file, that is, to control the viewing of the chat content.

Through the navigation, the contents presented to all users are synchronized, and therefore, all of them view the same page of the PPT file.

According to one embodiment of the present disclosure, each page of the PPT file may have a unique URL, and as a result, the whole PPT file may correspond to multiple URLs. Since each page may have a unique URL, any navigation operation may lead to a change of URL. When the URL is changed by a turning forward or backward operation, the changed URL may be inserted in the chat transcript as a separator as shown at S53. After the chat, the chat transcript may be segmented according to the separators, and the segmented chat transcript and the corresponding relationships between the URL and corresponding chat transcript segments may be stored, as shown at S54. According to another embodiment, the segmented chat transcript may be stored in a PPT file server.

As will be appreciated by one skilled in the art, aspects of the present invention may be embodied as a system, apparatus, method or computer program product. Accordingly, and as mentioned above, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described below with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method for maintaining corresponding relationships between at least one chat transcript and related chat content in an instant messaging system, comprising:
   establishing a chat session in the instant messaging system;
   displaying corresponding chat content synchronously according to a changed address of the chat content, wherein the changed address of the chat content includes a unique uniform resource locator (URL) identifying a discrete portion of the chat content;
   inserting the URL into a chat transcript as a separator, and segmenting the chat transcript into at least two segments to create a segmented chat transcript, each segment relating to a corresponding single respective address; and
   storing the segmented chat transcript and corresponding relationship between the URL and corresponding chat transcript segments.

2. The method according to claim 1, wherein the changed address of the chat content is at least one of a Web URL or an address of a local file.

3. The method according to claim 2, wherein each page of the local file is assigned a different URL.

4. The method according to claim 1, wherein the segmented chat transcript is stored in the chat content as metadata.

5. The method according to claim 1, wherein establishing a chat session further comprises associating the chat session with corresponding chat contents.

6. The method according to claim 1, wherein storing the segmented chat transcript further comprises:
   acquiring an address of the chat content;
   acquiring a chat transcript segment between the address of the chat content and address of a next chat content; and
   associating the address of the chat content with the acquired chat transcript segment to acquire a relationship between the address of the chat content and corresponding chat transcript segment.

7. A computer program product comprising a non-transitory computer readable medium having a plurality of instructions stored thereon, which, when executed by a processor, cause the processor to perform operations for maintaining corresponding relationships between at least one chat transcript and a related chat content in an instant messaging system, comprising:
   establishing a chat session in the instant messaging system;
   displaying corresponding chat content synchronously according to a changed address of the chat content, wherein the changed address of the chat content includes a unique uniform resource locator (URL) identifying a discrete portion of the chat content;
   inserting the URL into a chat transcript as a separator, and segmenting the chat transcript into at least two segments to create a segmented chat transcript, each segment relating to a corresponding single respective address; and
   storing the segmented chat transcript and corresponding relationship between the URL and corresponding chat transcript segments.

8. The computer program product according to claim 7, wherein the changed address of the chat content is at least one of a Web URL or an address of a local file.

9. The computer program product according to claim 8, wherein each page of the local file is assigned a different URL.

10. The computer program product according to claim 7, wherein the segmented chat transcript is stored in the chat content as metadata.

11. The computer program product according to claim 7, further comprising displaying corresponding chat content based on chat content address.

12. The computer program product according to claim 7, wherein the chat session is associated with corresponding chat contents.

13. The computer program product according to claim 7, wherein an address of the chat content is acquired, a chat transcript segment between the address of the chat content and address of a next chat content is acquired, the address of the chat content is associated with the acquired chat transcript segment to acquire a relationship between the address of the chat content and corresponding chat transcript segment.

14. A computing system for maintaining corresponding relationships between at least one chat transcript and a related chat content in an instant messaging system, comprising:
   a processor;
   a memory module coupled with the processor;
   a first software module executable by the processor and the memory module, wherein the first software module is configured to establish a chat session in the instant messaging system;
   a second software module executable by the processor and the memory module, wherein the second software module is configured to control displaying corresponding chat content synchronously according to a changed address of the chat content, wherein the changed address of the chat content includes a unique uniform resource locator (URL) identifying a discrete portion of the chat content;
   a third software module executable by the processor and the memory module, wherein the third software module is configured to insert the URL into a chat transcript as a separator, and segmenting the chat transcript into at least two segments to create a segmented chat transcript, each segment relating to a corresponding single respective address; and
   a fourth software module executable by the processor and the memory module, wherein the fourth software module is configured to store the segmented chat transcript and corresponding relationship between the URL and corresponding chat transcript segments.

15. The computing system according to claim 14, wherein changed address of the chat content is at least one of a Web URL or an address of a local file.

16. The computing system according to claim 15, wherein each page of the local file is assigned a different URL.

17. The computing system according to claim 14, wherein the segmented chat transcript is stored in the chat content as metadata.

* * * * *